US012209232B2

(12) United States Patent
Smets et al.

(10) Patent No.: US 12,209,232 B2
(45) Date of Patent: *Jan. 28, 2025

(54) CONSUMER PRODUCT COMPOSITIONS WITH PERFUME ENCAPSULATES

(71) Applicant: The Procter & Gamble Company, Cincinnati, OH (US)

(72) Inventors: Johan Smets, Lubbeek (BE); Rafael Trujillo, Mason, OH (US); Amanda Kiser Jukes, Brussels (BE); An Pintens, Brasschaat (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,269

(22) Filed: Jun. 30, 2023

(65) Prior Publication Data

US 2023/0340375 A1 Oct. 26, 2023

Related U.S. Application Data

(63) Continuation of application No. 16/809,589, filed on Mar. 5, 2020, now Pat. No. 11,732,222.
(Continued)

(30) Foreign Application Priority Data

May 8, 2019 (EP) .................................... 19173282

(51) Int. Cl.
*C11D 1/00* (2006.01)
*B08B 3/04* (2006.01)
(Continued)

(52) U.S. Cl.
CPC .............. *C11D 3/505* (2013.01); *C11D 3/044* (2013.01); *C11D 3/3761* (2013.01)

(58) Field of Classification Search
CPC .... C11D 1/00; C11D 1/62; C11D 3/37; C11D 3/3746; C11D 3/3757; C11D 3/50; C11D 3/502; C11D 3/505; B08B 3/04
See application file for complete search history.

(56) References Cited

U.S. PATENT DOCUMENTS 9,890,351 B2 2/2018 Smets
9,895,297 B2 2/2018 Ribaut
(Continued)

FOREIGN PATENT DOCUMENTS

CN 102015092 A 4/2011
CN 105492588 A 4/2016
(Continued)

OTHER PUBLICATIONS

All Office Actions, U.S. Appl. No. 16/809,589, filed Mar. 5, 2020.

*Primary Examiner* — Brian P Mruk
(74) *Attorney, Agent, or Firm* — Carolyn S. Powell; Andrew J. Mueller

(57) ABSTRACT

Consumer product composition that includes encapsulates, the encapsulates having a core that includes perfume characterized by an acid value of greater than 5.0 mg KOH/g of perfume, the encapsulates also including a shell that includes a (meth)acrylate material. Methods of making and using such compositions.

17 Claims, 1 Drawing Sheet

Related U.S. Application Data

(60) Provisional application No. 62/814,331, filed on Mar. 6, 2019.

(51) Int. Cl.

| | |
|---|---|
| ***C11D 1/62*** | (2006.01) |
| ***C11D 3/04*** | (2006.01) |
| ***C11D 3/37*** | (2006.01) |
| ***C11D 3/50*** | (2006.01) |

(56) References Cited

U.S. PATENT DOCUMENTS

| | | | | |
|---|---|---|---|---|
| 10,059,907 | B2 | 8/2018 | Ribaut | |
| 10,738,267 | B2 * | 8/2020 | Lintula | C11D 17/0039 |
| 11,732,222 | B2 * | 8/2023 | Smets | C11D 3/3765<br>510/101 |
| 11,970,676 | B2 * | 4/2024 | Smets | C11D 17/042 |
| 2010/0286018 | A1 | 11/2010 | Hentze | |
| 2015/0017214 | A1 | 1/2015 | Warr | |
| 2017/0002301 | A1 | 1/2017 | Dihora | |
| 2018/0265816 | A1 * | 9/2018 | Lintula | C11D 3/046 |
| 2019/0062676 | A1 | 2/2019 | Ott | |
| 2020/0283705 | A1 | 9/2020 | Smets | |

FOREIGN PATENT DOCUMENTS

| | | | |
|---|---|---|---|
| CN | 108430445 | A | 8/2018 |
| CN | 109152711 | A | 1/2019 |
| EP | 2620211 | A2 | 7/2013 |
| EP | 2832440 | A1 | 2/2015 |
| EP | 2832441 | A1 | 2/2015 |
| JP | 2013525564 | A | 6/2013 |
| JP | 2017080651 | A | 5/2017 |
| WO | 2013022949 | A1 | 2/2013 |
| WO | 2017004339 | A1 | 1/2017 |

* cited by examiner

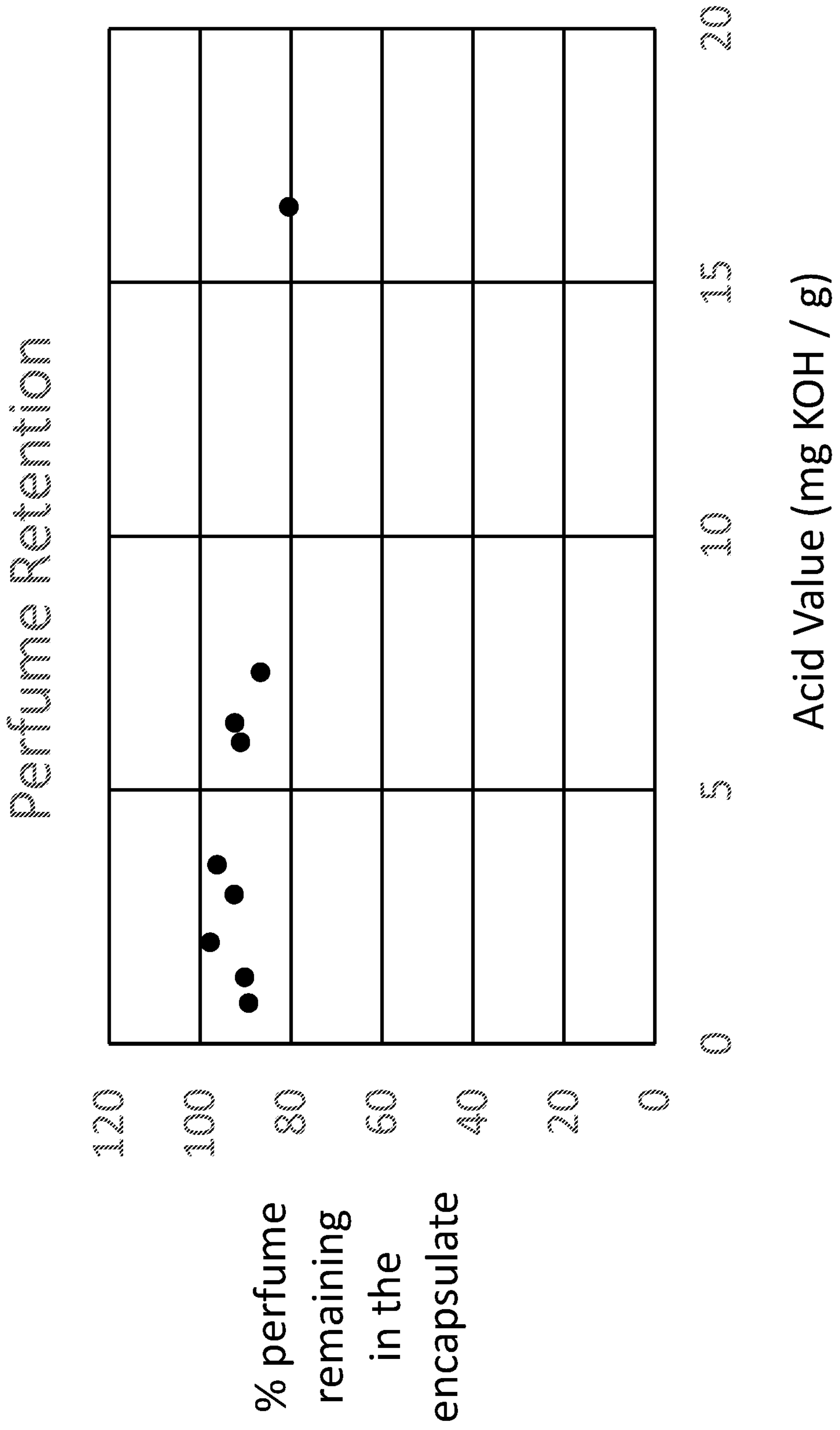
Perfume Retention
% perfume remaining in the encapsulate
0
20
40
60
80
100
120
Acid Value (mg KOH / g)
0
5
10
15
20

CONSUMER PRODUCT COMPOSITIONS WITH PERFUME ENCAPSULATES

CROSS-REFERENCE TO RELATED APPLICATIONS

This application is a continuation of Ser. No. 16/809,589, filed Mar. 5, 2020, now U.S. Pat. No. 11,732,222, which claims benefit of Provisional Ser. No. 62/814,331, filed on Mar. 6, 2019.

FIELD OF THE INVENTION

The present disclosure relates to consumer product compositions that include perfume encapsulates, where the perfume is characterized by a particular acid value. Related methods of making and using such compositions are also disclosed.

JOINT RESEARCH AGREEMENT

The inventions described and claimed herein were made pursuant to a Joint Research Agreement between The Procter & Gamble Company and Encapsys, LLC (Appleton, WI, USA).

BACKGROUND OF THE INVENTION

Perfumes are often desirable ingredients to include in consumer products, such as laundry detergent, fabric softeners, and/or hair treatment products, such as shampoo or conditioners. The perfume can provide pleasing aesthetics to the product itself, or to the surface (e.g., a fabric or hair) treated with the product.

To improve perfume deposition and/or longevity, a perfume delivery system may be used. Core-shell encapsulation, where the perfume is encapsulated by a polymeric shell, is a technology that is commonly used in consumer products. The shell material may be selected from any number of polymers or mixtures thereof. When the shell is ruptured, the perfume is released.

However, the presence of certain perfume compounds in the core of the encapsulate may result in capsule instability. For example, WO2017/148504 discloses that certain perfume compounds, such as those containing aldehyde, acetal, and/or ester functionality, may form carboxylic acids when in the presence of atmospheric oxygen and/or by hydrolysis. It is believed that the resulting acids can impair the quality of the capsule wall and may result in perfume leakage out of the encapsulate. To remedy this problem, WO2017/148504 discloses that the selection of certain scent compositions, specifically those characterized by an acid value of no more than 5 mg KOH/g immediately before encapsulation (preferably determined according to DIN EN ISO 660: 2009-10), can provide improved capsule performance.

To obtain scent compositions or perfume mixtures with acid values of no more than 5 mg KOH/g, the formulator may need to limit the amount of certain ingredients, such as those containing aldehydes, acetals, and/or esters. However, these ingredients may be desirable to provide a certain scent experience to the consumer.

It would be desirable to provide perfume encapsulates and related consumer products that provide acceptable freshness benefits and/or low encapsulate leakage without unduly limiting the formulator to certain perfume formulations.

SUMMARY OF THE INVENTION

The present disclosure relates to consumer product compositions that include perfume encapsulates, the perfume being characterized by a particular acid value and the shell of the encapsulate including an acrylate material.

For example, the present disclosure relates to a consumer product composition that includes encapsulates, the encapsulates having a core and a shell surrounding the core, the core including a perfume, the perfume being characterized by an acid value of greater than 5.0 mg KOH/g immediately before encapsulation, as determined by the Acid Value Determination method described in the present disclosure, and the shell having a polymeric material, the polymeric material including an acrylate polymer; and a consumer product adjunct.

The present disclosure also relates to a method of treating a surface or article with consumer product compositions according to the present disclosure, where the method includes contacting the surface or article with the consumer product composition, optionally in the presence of water.

BRIEF DESCRIPTION OF THE DRAWINGS

The FIGURES herein are illustrative in nature and are not intended to be limiting.

FIG. 1 shows a graph of encapsulate perfume retention upon storage in a detergent product.

DETAILED DESCRIPTION OF THE INVENTION

The present disclosure relates to certain core-shell encapsulates that include perfumes having relatively high acid values, as well as compositions and processes that relate to such encapsulates. It has been found that the selection of particular shell materials, specifically acrylate materials, can result in perfume encapsulates that provide surprisingly low leakage, even when containing perfumes characterized by, e.g., an acid value of greater than 5.0 mg KOH/g. It has surprisingly been found that the insufficient surfactant stability of the fragrance capsules is associated with the presence of aldehydic fragrances or fragrances with ester groups. Aldehydes have a tendency to form carboxylic acids in the presence of atmospheric oxygen; esters (and correspondingly also lactones) can saponify and in this way also form carboxyl groups.

Without wishing to be bound by theory, it is believed that for a radical-based capsule formation, and especially if part of this radical-based capsule formation is obtained from polymer formation from the oil phase, like for polyacrylate-based capsules, the sensitivity to the perfume materials such as aldehydes and esters, which may be prone to transforming into acids materials that are typically charged, is less compared to capsules formed by other formation mechanisms, such as coacervate formation, condensation reaction mechanism, and/or interfacial polymerization. It is believed that this lower sensitivity stems from the fact that the formed acids can interfere more easily into the other capsule formation mechanism due to their explicit charge as acids, and can therefore interact with the chemical species intended to make the capsule wall.

As it has been reported that encapsulated perfumes having an acid value above 5.0 mg KOH/g tend to leak and/or provide poor performance in compositions that comprise surfactant (such as hair shampoo, liquid detergent, or a fabric softener), the encapsulates of the present disclosure, which tend to have relatively low leakage rates, may be particularly preferred in compositions that contain surfactant and/or conditioning actives, or when used in applications that comprise such materials in an aqueous environment, such as during washing or other treatment operations, e.g., in a washing machine, shower, or bathtub.

The encapsulates, compositions, and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product" means baby care, personal care, fabric & home care, family care, feminine care, health care, snack and/or beverage products or devices intended to be used or consumed in the form in which it is sold, and not intended for subsequent commercial manufacture or modification. Such products include but are not limited to diapers, bibs, wipes; products for and/or methods relating to treating hair (human, dog, and/or cat), including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; products and/or methods relating to oral care including toothpastes, tooth gels, tooth rinses, denture adhesives, tooth whitening; over-the-counter health care including cough and cold remedies, pain relievers, RX pharmaceuticals, pet health and nutrition, and water purification.

As used herein, the term "cleaning composition" includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Consumer Product Composition

The present disclosure relates to consumer product compositions. The compositions may comprise encapsulates, as described in more detail below.

The composition may be a consumer product. The consumer product may be useful as a baby care, beauty care, fabric & home care, family care, feminine care, or health care product or device. The composition may be a beauty care composition, a fabric care composition, a home care composition, or combinations thereof.

The composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The composition may be a fabric care composition, such as a laundry detergent composition (including a heavy-duty washing detergent), a fabric conditioning composition (including a fabric softening and/or enhancing composition), a laundry additive (e.g., a rinse additive), a fabric pre-treatment composition, a fabric refresher composition, or a mixture thereof.

The composition may be a home care composition, such as an air care, car care, dishwashing, hard surface cleaning and/or treatment, and other cleaning for consumer or institutional use.

The composition may be in any suitable form. For example, the composition may be in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof. The composition can be selected from a liquid, solid, or combination thereof. Preferably, the composition is a liquid. The liquid may be encapsulated by water-soluble film to form a unit dose article, such as a pouch.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof. Preferably, the liquid composition is selected from a liquid laundry detergent, a liquid fabric enhancer, or combinations thereof. The liquid may be packaged in an aerosol can or other spray bottle.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may have a viscosity of from 1 to 1500 centipoises (1-1500 mPa*s), preferably from 100 to 1000 centipoises (100-1000 mPa*s), or more preferably from 200 to 500 centipoises (200-500 mPa*s) at 20 $s^{-1}$ and 21° C. Compositions having such viscosities are convenient to use without being too thick or thin.

Encapsulates

The present disclosure relates to encapsulates. The consumer product compositions of the present disclosure comprise encapsulates. As more than one encapsulate is typically present, the compositions may be described as comprising a plurality or population of encapsulates.

The composition may comprise from about 0.05% to about 20%, or from about 0.05% to about 10%, or from about 0.1% to about 5%, or from about 0.2% to about 2%, by weight of the composition, of encapsulates. The composition may comprise a sufficient amount of encapsulates to provide from about 0.05% to about 10%, or from about 0.1% to about 5%, or from about 0.1% to about 2%, by weight of the composition, of perfume to the composition. When discussing herein the amount or weight percentage of the encapsulates, it is meant the sum of the shell material and the core material.

The encapsulates may have a volume weighted median encapsulate size from about 0.5 microns to about 100 microns, or even 10 to 100 microns, preferably from about 1 micron to about 60 microns, or even 10 microns to 50 microns, or even 20 microns to 45 microns, or alternatively 20 microns to 60 microns.

Core

The encapsulates of the present disclosure may comprise a core. The core may be surrounded by a shell. The core may comprise a perfume. The perfume may comprise a single perfume raw material or a mixture of perfume raw materials.

The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

The perfume raw materials may comprise a perfume raw material selected from the group consisting of perfume raw materials having a boiling point (B.P.) lower than about 250° C. and a C log P lower than about 3, perfume raw materials having a B.P. of greater than about 250° C. and a C log P of greater than about 3, perfume raw materials having a B.P. of greater than about 250° C. and a C log P lower than about 3, perfume raw materials having a B.P. lower than about 250° C. and a C log P greater than about 3 and mixtures thereof. Perfume raw materials having a boiling point B.P. lower than about 250° C. and a C log P lower than about 3 are known as Quadrant I perfume raw materials. Quadrant I perfume raw materials are preferably limited to less than 30% of the perfume composition. Perfume raw materials having a B.P. of greater than about 250° C. and a C log P of greater than about 3 are known as Quadrant IV perfume raw materials, perfume raw materials having a B.P. of greater than about 250° C. and a C log P lower than about 3 are known as Quadrant II perfume raw materials, perfume raw materials having a B.P. lower than about 250° C. and a C log P greater than about 3 are known as a Quadrant III perfume raw materials. Suitable Quadrant I, II, III and IV perfume raw materials are disclosed in U.S. Pat. No. 6,869,923 B1.

The perfume in the core of the encapsulates may comprise perfume raw materials capable of forming an acid. For example, aldehydes (and correspondingly, also acetals) have a tendency to form carboxylic acids in the presence of atmospheric oxygen; esters (and correspondingly, also lactones) can saponify, thereby forming carboxyl groups. Despite the formulation challenges associated with these acid-forming materials, they remain desirable to formulate into product due to the pleasing aesthetics that they may provide.

The perfume of the core may be characterized by an acid value. The acid value is effectively a measurement of the amount of free carboxylic acids present in the perfume prior to encapsulation. The perfume may be characterized by an acid value of greater than 5.0 mg/KOH immediately before encapsulation, as determined by the Acid Value Determination method provided in the test methods section below. The perfume may be characterized by an acid value of greater than 5.25, or greater than 5.50, or greater than 5.75, or greater than 6.0 mg/KOH immediately before encapsulation. The perfume may be characterized by an acid value of from about 5.0 to about 25, or from about 5.0 to about 20, or from about 5.5 to about 20, or from about 6 to about 20, or from about 8 to about 20, or from about 10 to about 20, or from about 12 to about 20, or from about 15 to about 20 mg/KOH immediately before encapsulation.

Perfume raw materials capable of forming an acid may include materials that include aldehyde, acetal, ester, and/or lactone moieties. The perfume of the present disclosure may comprise from about 30% to about 75%, or from about 35% to about 70%, or from about 40 to about 60%, by weight of the total perfume in the core immediately after encapsulate formation, of perfume raw materials that comprise aldehyde moieties, acetal moieties, ester moieties, lactone moieties, or mixtures thereof.

The encapsulated perfume of the present disclosure may comprise aldehyde compounds, ester compounds, or mixtures thereof. The perfume of the present disclosure may comprise from about 30% to about 75%, or from about 35% to about 70%, or from about 40 to about 60%, by weight of the total perfume in the core immediately after encapsulate formation, of aldehyde compounds, ester compounds, or mixtures thereof. The perfume of the present disclosure may comprise from about 2% to about 30%, or from about 3% to about 25%, or from about 4% to about 20%, or from about 4% to about 15%, by weight of the total perfume in the core immediately after encapsulate formation, of aldehyde compounds. The perfume of the present disclosure may comprise from about 10% to about 60%, or from about 20% to about 50%, or from about 30% to about 50%, by weight of the total perfume in the core immediately after encapsulate formation, of ester compounds.

Perfume raw materials capable of forming an acid may include: aliphatic aldehydes and/or their acetals; cycloaliphatic aldehydes; aromatic and/or araliphatic aldehydes; aliphatic, aromatic, or araliphatic esters; lactones; or mixtures thereof.

Aliphatic aldehydes and their acetals may include: hexanal; heptanal; octanal; nonanal; decanal; undecanal; dodecanal; tridecanal; 2-methyloctanal; 2-methyl nonanal; (F)-2-hexenal; (Z)-4-heptenal; 2,6-dimethyl-5-heptenal; 10-undecenal; (F)-4-decenal; 2-dodecenal; 2,6,10-trimethyl 5,9-undecadienal; heptanal diethyl; 1, 1-dimethoxy-2,2,5-trimethyl-4-hexene; citronellyloxyacetaldehyde; or mixtures thereof.

Cycloaliphatic aldehydes may include: 2,4-dimethyl-3-cyclohexene carbaldehyde; 2-methyl-4-(2,2,6-trimethylcyclohexen-1-yl)-2-butenoyl; 4-(4-hydroxy-4-methylpentyl)-3-cyclohexene carbaldehyde; 4-(4-methyl-3-penten-1-yl)-3-cyclohexene carbaldehyde; or mixtures thereof.

Aromatic and araliphatic aldehydes may include: benzaldehyde; phenylacetaldehyde; 3-phenylpropanal; Hydratropaaldehyde; 4-methylbenzaldehyde; 4-methylphenylacetaldehyde; 3-(4-ethylphenyl)-2,2-dimethylpropanal; 2-methyl-3-(4-isopropylphenyl) propanal; 2-methyl-3-(4-tert-butylphenyl) propanal; 3-(4-tert-butylphenyl) propanal; cinnamic aldehyde; a-butylzimtaldehyde; a-amyl cinnamic aldehyde; a-hexyl cinnamic aldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl) propanal; 2-methyl-3-(4-methylenedioxyphenyl) propanal; or mixtures thereof.

Aliphatic carboxylic acid esters may include: (c) and (Z)-3-hexenylformate; ethyl acetatoacetate; isoamyl; hexyl acetate; 3,5,5-trimethylhexyl acetate; 3-methyl-2-butenyl acetate; (E)-2-hexenyl acetate; (E)- and (Z)-3-hexenylacetate; octyl acetate; 3-octyl acetate; 1-octene-3-yl acetate; ethyl butyrate; butyl butyrate; isoamyl; hexyl butyrate; (£)- and (Z)-3-hexenyl isobutyrate; hexyl crotonate; ethylisovalerianat; ethyl 2-methylpentanoate; Ethylhexanoate; allyl hexanoate; ethyl heptanoate; allyl heptanoate; ethyl octanoate; ethyl (f, Z)-2,4-decadienoate; Methyl-2-octinat; Methyl-2-noninat; Allyl-2-isoamyloxyacetat; Methyl 3,7-dimethyl-2,6-octadienoate; or mixtures thereof.

Esters of cyclic alcohols may include: 2-tert-butylcyclohexyl acetate; 4-tert-butylcyclohexyl acetate; 2-tert-pentylcyclohexyl acetate; 4-tert-pentylcyclohexyl acetate; Decahydro-2-naphthyl acetate; 3-pentyltetrahydro-2H-pyran-4-yl acetate; decahydro-2,5,5,8a-tetramethyl-2-naphthyl acetate; 4,7-methano-3a, 4,5,6,7,7a-hexahydro-5- or -6-indenyl acetate; 4,7-methano-3a, 4,5,6,7,7ahexahydro-5- or -6-indenylpropionate; 4,7-methano-3a, 4,5,6,7,7a-hexahydro-5- or -6-indenyl isobutyrate; 4,7-methanooctahydro-5- or -6-indenyl acetate; or mixtures thereof.

Esters of araliphatic alcohols and aliphatic carboxylic acids may include benzyl acetate; benzylpropionate; benzyl isobutyrate; B enzylisovalerianat; 2-phenylethyl acetate; 2-phenylethyl propionate; 2-Phenylethylisobutyrat; 2-Phenylethylisovalerianat; 1-phenylethyl acetate; a-trichlormethylbenzylacetat; a, a-dimethylphenylethylacetat; a, a-dimethyl-phenylethyl butyrate; cinnamyl; 2-phenoxyethyl isobutyrate; 4-methoxybenzyl acetate; or mixtures thereof.

Esters of cycloaliphatic carboxylic acids may include: allyl-3-cyclohexylpropionate; allylcyclohexyl oxyacetate; methyldihydrojasmonate; methyl jasmonate; methyl 2-hexyl-3-oxocyclopentanecarboxylate; ethyl 2-ethyl-6,6-dimethyl-2-cyclohexenecarboxylate; ethyl 2,3,6,6-tetramethyl-2-cyclohexene carboxylate; Ethyl-2-methyl-1,3-dioxolan-2-acetate; or mixtures thereof.

Aromatic and araliphatic carboxylic acid esters may include: methyl benzoate; ethyl benzoate; hexyl benzoate; benzyl benzoate; methyl phenylacetate; ethyl phenylacetate; geranylphenylacetate; phenylethyl phenylacetate; methyl cinnamate; ethylcinnamate; benzyl cinnamate; phenylethylcinnamat; cinnamyl cinnamate; allyl phenoxyacetate; methyl salicylate; isoamylsalicylate; hexyl salicylate; cyclohexyl salicylate; c is-3-hexenyl salicylate; benzyl; phenylethyl salicylate; methyl-2,4-dihydroxy-3,6-dimethylbenzoate; ethyl 3-phenylglycidate; ethyl 3-methyl-3-phenyl glycidate; or mixtures thereof.

It is known that not all aldehydes are prone to oxidation into acids in the same manner, just as it is known that not all esters are equally likely to transform into acids. Thus, perfume mixtures that may facially have similar amounts of aldehydes and/or esters may be characterized by different acid values, depending on the particular aldehydes and/or esters present in each perfume mixture.

For example, a compound's likelihood of oxidation may relate to the compound's ionization potential. Without wishing to be bound by theory, it is believed that the lower a compound's ionization potential, the more likely it is that oxidation will occur. The perfume of the core may include perfume raw materials that are characterized by relatively low ionization potentials, for example equal to or less than about 8.5, or equal to or less than about 8.0, or equal to or less than about 7.5. The perfume of the core may include a certain minimum of such perfume raw materials, such as at least about 10%, or at least about 20%, or at least about 30%, or at least about 40%, or at least about 50%, by weight of the perfume of the core. Higher amounts of such materials may provide higher acid values for the perfume, and the encapsulates of the present disclosure are believed to be particularly well-suited for encapsulating such perfumes.

Certain esters may also be more likely to hydrolyze under certain conditions than others. Those esters that are more likely to undergo acidic hydrolysis may lead to more carboxylic acid formation and therefore greater acid values. Furthermore, without wishing to be bound by theory, it is believed that esters that are more likely to undergo basic hydrolysis may contribute to encapsulate leakage, as the salts formed upon hydrolysis may enter an aqueous phase and be more likely to leave the core of an encapsulate.

Differences in ionization potentials and/or hydrolysis rates may be affected by a perfume raw material's structure. For example, steric hindrance near an ester moiety may result in lower-than-expected hydrolysis rates.

As mentioned above, it is believed that certain aldehydes are more sensitive to oxidation than others. The perfume of the core may comprise one or more of the following aldehydic perfume raw materials, which are believed to be relatively prone to oxidation into acids: 2,6-dimethyl-octanal; 2,2,5-trimethyl-4-Hexenal; Scentenal; 2-Phenyl-3-(2-furyl)prop-2-enal; (1)-Citronellal; Tetrahydrogeranial; 2-Ethoxybenzaldehyde; 5-Methylfurfural; Calypsone; d-xylose; 3-(2-furanyl)-2-methyl-2-propenal; 3,5,5-Trimethylhexanal; Canthoxal; 2,4,5-trimethoxy-benzaldehyde; 4-hydroxy-3-methoxy-cinnamaldehyde; 2,4,6-trimethoxybenzaldehyde; 3,4,5-trimethoxybenzaldehyde; 2,3,4-trimethoxy-benzaldehyde; (d)-Citronellal; Lyral; Methyl octyl acetaldehyde; Octanal, 3,7-dimethyl-; Adoxal; Citronellyloxyacetaldehyde; cis-3-Hexenyloxyacetaldehyde; Methoxymelonal; n-Hexanal; Pentyl vanillin; o-Methoxycinnamaldehyde; o-Anisaldehyde; Octanal; Nonaldehyde; 2,6,10-Trimethylundecanal; Citronellal; Melonal; Hydroxycitronellal; Prenal; Methyl nonyl acetaldehyde; Valeraldehyde; Capraldehyde; p-Anisaldehyde; Heptaldehyde; Ethyl vanillin; Vanillin; Heliotropin; Helional; Veratraldehyde; Methoxycitronellal; 7-Ethoxy-3,7-dimethyloctanal; 4-Ethoxybenzaldehyde; Vanillin isobutyrate; Vanillin acetate; Ethyl vanillin acetate; 1-methyl-4-(4-methyl-3-penten-1-yl)-3-Cyclohexene-1-carboxaldehyde; 8-Undecenal; trans,trans-2,4-Nonadienal; beta-Sinensal; 6-Cyclopentylidene hexanal; Precyclemone B; Tangerinal; 2-Thiophenecarboxaldehyde; 9-decenal; trans-2,cis-6-Nonadienal; Acalea; 4-tert-Butylbenzaldehyde; trans-2-Methyl-2-octenal; Citral; 3-Methyl-5-phenyl-1-pentanal; 2-Decenal; trans-2-Decenal; alpha,4-Dimethyl benzenepropanal; cis-5-Octenal; cis-7-Decen-1-al; cis-4-Decen-1-al; 2-trans-6-cis-Dodecadienal; 2-trans-4-trans-Dodecadienal; 3-Cyclohexene-1-propanal; 2-Nonen-1-al; 2-Undecenal; 2,4-Decadienal, (E,E)-; 2,4-Undecadienal, (E,E)-; Isohexenyl cyclohexenyl carboxaldehyde; trans-2-Nonen-1-al; 3-Nonylacrolein; 2,6-Nonadienal; Lilial; 2-trans-6-trans-Nonadienal; alpha-Sinensal; Bourgeonal; 2-Tridecenal; p-t-butyl phenyl acetaldehyde; (Z)-3-Dodecenal; m-Methylbenzaldehyde; Mefloral; trans-4-Decen-1-al; Silvial; 2-Hexen-1-al; 2,4-Nonadienal; Floralozone; Aldehyde C-11; cis-3-Hexenal; Myristaldehyde; Cinnamic aldehyde; p-Tolualdehyde; Undecanal; 10-Undecenal; Lauraldehyde; Trans-2-Hexenal; Geranial; 5-methyl-2-thiophenecarboxaldehyde; Phenylacetaldehyde; alpha-Amylcinnamaldehyde; Floral Super; Hexyl cinnamic aldehyde; alpha-methyl cinnamaldehyde; Benzaldehyde; or mixtures thereof. Preferably, perfume of the core may comprise one or more of the following aldehydic perfume raw materials, as such PRMs are particularly aesthetically desirable: Scentenal; Adoxal; Ocatanal; Nonaldehyde; Melonal; Methyl nonyl acetaldehyde; p-Anisaldehyde; Ethyl vanillin; Vanillin; Heliotropin; Lilial; Aldehyde C-11; Undecanal; 10-Undecenal; Lauraldehyde; or mixtures thereof.

Similarly, it is believed that certain esters are more likely to transform into acids than others. The perfume of the core may comprise one or more of the following ester perfume raw materials, which are believed to be relatively prone to transformation into acids: Quincester; Serenolide; Nirvanolide; Acetarolle; Alpinofix; Aladinate; Methyl Laitone; Firascone; 1-Hepten-1-ol, 1-acetate; (Z)-3-hepten-1-yl acetate; 3-hydroxy-4,5-dimethyl-2(5H)-furanone; Isoamyl undecylenate; Verdox HC; Pivarose Q; Citryl acetate; (E)-5-Tangerinol; (Z)-5-Tangerinol; Myraldyl acetate; Geranyl phenyl acetate; Bergaptene; Isopimpinellin; Parsol MCX; Ethyl beta-safranate; Nopyl acetate; Calyxol; Methyl Octalactone; Isopulegyl acetate; Ethyl tiglate; Vanoris; Acetoxymethyl-isolongifolene (isomers); 1-Oxaspiro[2.5]octane-2-carboxylic acid, 5,5,7-trimethyl-, ethyl ester; 3,6-Dimethyl-3-octanyl acetate; cis-3-hexenyl-cis-3-hexenoate; cis-3-Hexenyl lactate; Sclareolide; Hexarose; Cis-iso-ambrettolide; Frutinat; Ethyl gamma-Safranate; Amyl Cinnamate; Isoambrettolide; Bornyl isobutyrate; Cyprisate; Anapear; Montaverdi; Vertosine; Isobornyl isobutyrate; Cyprisate Ci; cyclobutanate; cis-3-Hexenyl butyrate; Geranyl tiglate; trans-Hedione; Isoamyl acetate; Givescone; Cyclogalbanate; Verdural B Extra; Ethyl alpha-safranate; Jasmal; Styrallyl acetate; Nonalactone; trans-ambrettolide; Furfuryl heptanoate; Furfuryl hexanoate; alpha-Amylcinnamyl acetate; Carvyl acetate; Ethyl isobutanoate; Citronellyl isobutyrate; Furfuryl octanoate; Octyl 2-furoate; Cedryl acetate; Isoamyl acetoacetate; Cis-3-hexenyl Benzoate; Phenyl ethyl benzoate; Hexenyl tiglate; Agrumea; gamma-Undecalactone (racemic); (S)-gamma-Undecalactone; (R)-gamma-Undecalactone; Phenyl benzoate; Geranyl benzoate; Isobutyl salicylate; Isoamyl salicylate; Verdox; 2-Acetoxy-3-butanone; Geranyl caprylate; (+)-D-Menthyl acetate; Prenyl benzoate; 7-Methoxycoumarin; cis-3-Hexenyl 2-methylbutyrate; cis-3-Hexenyl trans-2-hexenoate; Ethyl valerate; n-Pentyl butyrate; Ethyl 3-hydroxybutyrate; Flor Acetate; Hexyl Neopentanoate; Decyl propionate; Phenethyl tiglate; 2-Phenyl-1(2)propenyl-1 ester; Methyl cyclopentylideneacetate; Isononyl acetate; p-Cresyl crotonate; Octahydrocoumarin; Methyl trans-2,cis-4-decadienoate; 3,3,5-Trimethylcyclohexyl acetate; Hexyl vanillate; cis-3-Hexenyl levulinate; Dimethyl anthranilate; Methyl 2-methylbutyrate; Butyl salicylate; Isomenthyl acetate; Dihydrocarveol acetate; Tetrahydrolinalyl acetate; Dimethyl Octanyl Acetate; Methyl cis-4-octenoate; Hexahydro-3,5,5-trimethyl-3,8a-ethano-8aH-1-benzopyran-2(3H)-one; Cyclohexylethyl acetate; alpha-acetoxystyrene; p-methylbenzyl acetate; Heptyl propionate; gamma-Dodecalactone; Neryl isobutyrate; Geranyl isobutyrate; Hexyl isobutyrate; Methyl geraniate; or mixtures thereof. Preferably, perfume of the core may comprise one or more of the following ester perfume raw materials, as such PRMs are particularly aesthetically desirable: Methyl Laitone; Verdox HC; Ethyl beta-safranate; Hexarose; cyclobutanate; Cyclogalbanate; Ethyl alpha-safranate; Jasmal; Styrallyl acetate; Nonalactone; gamma-Undecalactone (racemic); Verdox; Flor Acetate; or mixtures thereof.

The perfume in the core may contain a mixture of perfume raw materials. The perfume in the core may comprise at least three, or at least four, or at least five, or at least six, or at least seven, or at least eight, or at least nine, or at least ten perfume raw materials. A mixture of perfume raw materials may provide more complex and desirable aesthetics, and/or better perfume performance or longevity, for example at a variety of touchpoints.

It may be that the perfume in the core comprises less than about fifty, or less than about forty, or less than about thirty, or less than about twenty-five, or less than about twenty perfume raw materials. It may be desirable to limit the number of perfume raw materials in the perfume as a way to reduce or limit formulation complexity and/or cost.

The perfume may comprise at least one, or at least two, or at least three perfume raw materials that do not form acids. The perfume may comprise at least one, or at least two, or at least three perfume raw materials that do not comprise an aldehyde, an acetal, an ester, and/or a lactone moiety.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core of the encapsulates of the present disclosure may comprise a partitioning modifier. The core may comprise, in addition to the encapsulated benefit agent, from greater than 0% to about 80%, preferably from greater than 0% to about 50%, more preferably from greater than 0% to about 30%, most preferably from greater than 0% to about 20%, based on total core weight, of a partitioning modifier.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described perfume encapsulates.

Shell

The encapsulates may comprise a shell. The shell may, partially or completely, surround the core.

The shell may comprise a polymeric material. The polymeric material may comprise a (meth)acrylate material. As described above, perfumes having an acid value of greater than 5.0 mg KOH/g have been found to perform surprising well when encapsulated in a shell comprising an acrylate material. The polymeric material of the shell may be formed, at least in part, by a radical polymerization process.

The acrylate material of the shell may include a (meth) acrylate material selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof.

As used herein, reference to the term “(meth)acrylate” or “(meth)acrylic” is to be understood as referring to both the acrylate and the methacrylate versions of the specified monomer, oligomer and/or prepolymer. For example, “allyl (meth)acrylate” indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth) acrylate, polyethylene glycol di(meth)acrylate and dipropylene glycol di(meth)acrylate and various multifunctional (meth)acrylates. Monofunctional acrylates, i.e., those containing only one acrylate group, may also be advantageously used. Typical monoacrylates include 2-ethylhexyl (meth)acrylate, 2-hydroxyethyl (meth)acrylate, cyanoethyl (meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

The main said shell material may comprise polyacrylate. The shell material may include from about 25% to about 100%, or from about 50% to about 100%, or from about 65% to about 100%, by weight of the shell material, of a polyacrylate polymer. The polyacrylate may include a polyacrylate cross linked polymer.

The (meth)acrylate material of the encapsulates may include a polymer derived from a material that comprises one or more multifunctional acrylate moieties. The multifunctional acrylate moiety may be selected from the group consisting of tri-functional acrylate, tetra-functional acrylate, penta-functional acrylate, hexa-functional acrylate, hepta-functional acrylate and mixtures thereof. The multifunctional acrylate moiety is preferably hexa-functional acrylate. The acrylate material may include a polyacrylate that comprises a moiety selected from the group consisting of an acrylate moiety, methacrylate moiety, amine acrylate moiety, amine methacrylate moiety, a carboxylic acid acrylate moiety, carboxylic acid methacrylate moiety, and combinations thereof, preferably an amine methacrylate or carboxylic acid acrylate moiety.

The (meth)acrylate material may include a material that comprises one or more multifunctional acrylate and/or multifunctional methacrylate moieties. The ratio of material that comprises one or more multifunctional acrylate moieties to material that comprises one or more methacrylate moieties may be from about 999:1 to about 6:4, preferably from about 99:1 to about 8:1, more preferably from about 99:1 to about 8.5:1.

Examples of multifunctional acrylates include commercial materials from Sartomer Inc., such as CN975 (a hexafunctional aromatic urethane acrylate), CN9006 (a hexafunctional aliphatic urethane acrylate), CN296, CN293, CN2295 (a hexafunctional polyester acrylate oligomer or acrylated polyester), CN2282, CN294E, CN299 (a tetrafunctional polyester acrylate oligomer or acrylated polyester), SR494, SR295, SR255 (a tetrafunctional acrylate oligomer), SR9009, SR9011 (a trifunctional methacrylate oligomer), SR929 (a polyester urethane acrylate oligomer), SR9053 (an acid ester trifunctional acrylate oligomer), CN989, CN9301 (an aliphatic urethane acrylate), SR350, SR353 (a trifunctional acrylate oligomer), SR9012 (a trifunctional acrylate ester), and/or SR368 (a tris (2-hydroxyethyl)isocyanurate triacrylate). The acrylate material may be derived from a monomer selected from a hexafunctional acrylate, a triacrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof, as such materials have be found to be useful in making robust capsules.

The encapsulate, based on total encapsulate weight, may comprise from about 0.1% to about 40%, preferably from about 0.5% to about 40%, more preferably 0.8% to 5% of an emulsifier. Emulsifiers may be useful as processing aids during formation of the encapsulates. The emulsifier may be embedded in and/or located on the shell. The emulsifier may be selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water.

The emulsifier preferably comprises polyvinyl alcohol. Preferably, the polyvinylalcohol has at least one the following properties, or a mixture thereof: (i) a hydrolysis degree from 70% to 99%, preferably 75% to 98%, more preferably from 80% to 96%, more preferably from 82% to 96%, most preferably from 86% to 94%; and/or (ii) a viscosity of from 2 mPa·s to 150 mPa·s, preferably from 3 mPa·s to 70 mPa·s, more preferably from 4 mPa·s to 60 mPa·s, even more preferably from 5 mPa·s to 55 mPa·s in 4% water solution at 20° C. Suitable polyvinylalcohol materials may be selected from Selvol 540 PVA (Sekisui Specialty Chemicals, Dallas, TX), Mowiol 18-88=Poval 18-88, Mowiol 3-83, Mowiol 4-98=Poval 4-98 (Kuraray), Poval KL-506=Poval 6-77 KL (Kuraray), Poval R-1130=Poval 25-98 R (Kuraray), Gohsenx K-434 (Nippon Gohsei).

The encapsulates of the present disclosure may comprise a coating. The shell may comprise the coating; for example, the coating may be on an outer surface of the shell. The encapsulates may be manufactured and be subsequently coated with a coating material. The coating may be useful as a deposition aid. Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise chitosan.

The compositions may comprise encapsulates according to the present disclosure wherein at least 75% of the encapsulates have an encapsulate shell thickness of from about 10 nm to about 350 nm, from about 20 nm to about 200 nm, or from 25 nm to about 180 nm, as determined by the Encapsulate Shell Thickness test method described herein.

Consumer Product Adjuncts

The consumer product compositions of the present composition may comprise a consumer product adjunct material. The consumer product adjunct material may provide a benefit in the intended end-use of a composition, or it may be a processing and/or stability aid.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

Depending on the intended form, formulation, and/or end-use, compositions of the present disclosure or may not may not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

Conditioning Active

The compositions of the present disclosure may include a conditioning active.

Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 3:1, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

Deposition Aid

The compositions of the present disclosure may comprise a deposition aid. Deposition aids can facilitate deposition of encapsulates, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with encapsulates (at the same time with, e.g., encapsulated benefit agents) or directly/independently in the fabric treatment composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

Encapsulates and Feedstock Compositions Thereof

The present disclosure further relates to encapsulates and feedstock compositions thereof. The encapsulates of the present disclosure, which may have a core and shell surrounding the core, are described in more detail above.

The encapsulates of the present disclosure may be made according to any known method using suitable starting materials. For example, encapsulates may be made by a process that comprises heating, in one or more heating steps, an emulsion, the emulsion produced by emulsifying the combination of: (a) a first composition formed by combining a first oil and a second oil, said first oil comprising a perfume, an initiator, and a partitioning modifier, preferably a partitioning modifier that comprises a material selected from the group consisting of vegetable oil (preferably comprising castor oil and/or soy bean oil), modified vegetable oil (preferably esterified and/or brominated), propan-2-yl tetradecanoate (i.e., isopropyl myristate) and mixtures thereof; preferably said partitioning modifier comprises propan-2-yl tetradecanoate; said second oil comprising (i) an oil soluble aminoalkylacylate and/or methacrylate monomer; (ii) a carboxy alkyl acrylate monomer and/or oligomer; (iii) a material selected from the group consisting of a multifunctional acrylate monomer, multifunctional methacrylate monomer, multifunctional methacrylate oligomer, multifunctional acrylate oligomer and mixtures thereof; (iv) a perfume; and (b) a second composition comprising water, a pH adjuster, an emulsifier, preferably an anionic emulsifier, preferably said emulsifier comprises polyvinyl alcohol and optionally an initiator.

In the described process, the heating step comprises heating the emulsion from about 1 hour to about 20 hours, preferably from about 2 hours to about 15 hours, more preferably about 4 hours to about 10 hours, most preferably from about 5 to about 7 hours, and/or heating sufficiently to transfer from about 500 joules/kg to about 5000 joules/kg, or from about 1000 joules/kg to about 4500 joules/kg, or from about 2900 joules/kg to about 4000 joules/kg to the emulsion.

The emulsion may be characterized by, prior to said heating step, a volume weighted median encapsulate size from about 0.5 microns to about 100 microns, preferably from about 1 microns to about 60 microns, more preferably from about 10 microns to about 25 microns or from about 0.5 microns to about 10 microns.

The weight ratio of the first composition to the second composition may be from about 1:9 to about 1:1, preferably from about 3:7 to about 4:6. The weight ratio of the first oil to the second oil may be from about 99:1 to about 1:99, preferably 9:1 to about 1:9, more preferably 6:4 to about 8:2.

The present disclosure also relates to feedstock compositions that comprise the encapsulates as described herein. Feedstock compositions, which may be convenient to store and/or transport, may be combined with other adjunct ingredients to form a consumer product composition. The feedstock composition may be a slurry or an agglomerate.

Slurries may include from about 1% to about 75%, or from about 5% to about 60%, or from about 20% to about 60%, or from about 30% to about 60%, by weight of the slurry, of encapsulates. Slurries may comprise about 25% to about 99%, or from about 40% to about 95%, or from about 40% to about 80%, or from about 40% to about 70%, by weight of the slurry, of water.

The slurry may comprise a processing aid, which may be selected from the group consisting of water, aggregate inhibiting materials (such as divalent salts), particle suspending polymers, solvents (polar and/or nonpolar), and mixtures thereof.

Examples of aggregate inhibiting materials include salts that can have a charge-shielding effect around the particle, such as magnesium chloride, calcium chloride, magnesium bromide, magnesium sulfate, and mixtures thereof.

Examples of particle suspending polymers include polymers such as xanthan gum, carrageenan gum, guar gum, shellac, alginates, chitosan; cellulosic materials such as carboxymethyl cellulose, hydroxypropyl methyl cellulose, cationically charged cellulosic materials; polyacrylic acid; polyvinyl alcohol; hydrogenated castor oil; ethylene glycol distearate; and mixtures thereof.

Examples of solvents (which, as used herein, is not intended to include water) include polar solvents, including but not limited to, ethylene glycol, propylene glycol, polyethylene glycol, glycerol, and nonpolar solvents, including but not limited to mineral oil, silicone oils, hydrocarbon paraffin oils, and mixtures thereof.

Slurries may further comprise a deposition aid, such as a polymer selected from the group comprising: polysaccharides, in one aspect, cationically modified starch and/or cationically modified guar; polysiloxanes; poly diallyl dimethyl ammonium halides; copolymers of poly diallyl dimethyl ammonium chloride and polyvinyl pyrrolidone; a composition comprising polyethylene glycol and polyvinyl pyrrolidone; acrylamides; imidazoles; imidazolinium halides; polyvinyl amine; copolymers of poly vinyl amine and N-vinyl formamide; polyvinylformamide, polyvinyl alcohol; polyvinyl alcohol crosslinked with boric acid; polyacrylic acid; polyglycerol ether silicone crosspolymers; polyacrylic acids, polyacrylates, copolymers of polyvinylamine and polvyinylalcohol oligomers of amines, in one aspect a diethylenetriamine, ethylene diamine, bis(3-aminopropyl)piperazine, N,N-Bis-(3-aminopropyl)methylamine, tris(2-aminoethyl)amine and mixtures thereof; polyethyleneimine, a derivatized polyethyleneimine, such as an ethoxylated polyethyleneimine; a polymeric compound comprising at least two moieties selected from the moieties consisting of a carboxylic acid moiety, an amine moiety, a hydroxyl moiety, and a nitrile moiety on a backbone of polybutadiene, polyisoprene, polybutadiene/styrene, polybutadiene/acrylonitrile, carboxyl-terminated polybutadiene/acrylonitrile or combinations thereof; pre-formed coacervates of anionic surfactants combined with cationic polymers; polyamines and mixtures thereof.

The feedstock composition may be an agglomerate that comprises the encapsulates and a second material. The second material may comprise a material such as silicas, citric acid, sodium carbonate, sodium sulfate, sodium chloride, and binders such as sodium silicates, modified celluloses, polyethylene glycols, polyacrylates, polyacrylic acids, zeolites and mixtures thereof.

One or more perfumes that are different from the perfume or perfumes contained in the core of the encapsulates can be used external to the core-shell encapsulates.

Method of Making a Consumer Product

The present disclosure relates to processes for making any of the compositions described herein. The process of making a composition, which may be a consumer product composition, may comprise the step of combining an encapsulate as described herein with a consumer product adjunct material as described herein.

The encapsulates may be combined with such one or more consumer product adjuncts materials when the encapsulates are in one or more forms, including a slurry form, neat encapsulate form, and/or spray dried encapsulate form. The encapsulates may be combined with such consumer product adjuncts materials by methods that include mixing and/or spraying.

The compositions of the present disclosure can be formulated into any suitable form and prepared by any process chosen by the formulator. The encapsulates and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

The composition may be encapsulated in water-soluble films according to known methods to form a unitized dose article.

The composition may be placed into an aerosol or other spray container according to known methods.

Method of Using a Consumer Product

The present disclosure further relates to methods of using a consumer product. For example, the present disclosure relates to methods of treating a surface or article with a composition according to the present disclosure. Such methods may provide cleaning, conditioning, and/or freshening benefits.

Suitable surfaces or articles may include fabrics (including clothing, towels, or linens), hard surfaces (such as tile, porcelain, linoleum or wood floors), dishware, hair, skin, or mixtures thereof.

The method may include a step of contacting a surface or article with a composition of the present disclosure. The composition may be in neat form or diluted in a liquor, for example, a wash or rinse liquor. The composition may be diluted in water prior, during, or after contacting the surface or article. The surface or article may be optionally washed and/or rinsed before and/or after the contacting step. The composition may be sprayed into the air and/or directly onto a surface or article.

The method of treating and/or cleaning a surface or article may include the steps of: (a) optionally washing, rinsing and/or drying the surface or article; (b) contacting the surface or article with a composition as described herein, optionally in the presence of water; (c) optionally washing and/or rinsing the surface or article; and (d) optionally dried by drying passively and/or via an active method such as a laundry dryer.

For purposes of the present invention, washing includes but is not limited to, scrubbing, and mechanical agitation. The fabric may comprise most any fabric capable of being laundered or treated in normal consumer use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

The present disclosure further relates to a surface or article treated with a composition as described herein. The surface or article treated with a composition according to the present disclosure may comprise encapsulates according to the present disclosure, for example in or on a surface following treatment.

COMBINATIONS

Specifically contemplated combinations of the disclosure are herein described in the following lettered paragraphs. These combinations are intended to be illustrative in nature and are not intended to be limiting.

A. A consumer product composition comprising: encapsulates, the encapsulates comprising a core and a shell surrounding the core, the core comprising a perfume, the perfume being characterized by an acid value of greater than 5.0 mg KOH/g immediately before encapsulation, as determined by the Acid Value Determination method described herein, and the shell comprising a polymeric material, the polymeric material comprising a (meth)acrylate material; and a consumer product adjunct.

B. A consumer product composition according to paragraph A, wherein the perfume is characterized by an acid value of greater than about 5.25, or greater than about 5.50, or greater than about 5.75, or greater than about 6.0 mg/KOH immediately before encapsulation.

C. A consumer product composition according to any of paragraphs A or B, wherein the perfume comprises from about 30% to about 75%, or from about 35% to about 70%, or from about 40 to about 60%, by weight of the total perfume in the core immediately after encapsulate formation, of aldehyde compounds, ester compounds, or mixtures thereof.

D. A consumer product composition according to any of paragraphs A-C, wherein the perfume comprises a material selected from the group consisting of: aliphatic aldehydes and/or their acetals; cycloaliphatic aldehydes; aromatic and/or araliphatic aldehydes; aliphatic, aromatic, or araliphatic esters; lactones; or mixtures thereof.

E. A consumer product composition according to any of paragraphs A-D, wherein the core further comprises a partitioning modifier, preferably a partitioning modifier selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof, more preferably isopropyl myristate.

F. A consumer product composition according to any of paragraphs A-E, wherein the polymeric material of the shell is formed, at least in part, by a radical polymerization process.

G. A consumer product composition according to any of paragraphs A-F, wherein the (meth)acrylate material is selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof.

H. A consumer product composition according to any of paragraphs A-G, wherein the (meth)acrylate material is derived from a material that comprises one or more multifunctional acrylate moieties, preferably wherein the multifunctional acrylate moiety is selected from the group consisting of tri-functional acrylate, tetra-functional acrylate, penta-functional acrylate, hexa-functional acrylate, hepta-functional acrylate, and mixtures thereof.

I. A consumer product composition according to any of paragraphs A-H, wherein the (meth)acrylate material is derived from a monomer selected from a hexafunctional acrylate, a triacrylate, or mixtures thereof, preferably a hexafunctional aromatic acrylate, an isocyanurate triacrylate, or mixtures thereof, more preferably a hexafunctional aromatic urethane acrylate, a tris (2-hydroxyethyl)isocyanurate triacrylate, or mixtures thereof.

J. A consumer product composition according to any of paragraphs A-I, wherein the encapsulates are characterized by a volume weighted median diameter of about 10 to about 100 microns.

K. A consumer product composition according to any of paragraphs A-J, wherein the consumer product adjunct comprises a material selected from the group consisting of surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, pigments, and mixtures thereof.

L. A consumer product composition according to any of paragraphs A-K, wherein the consumer product adjunct comprises a surfactant, preferably the surfactant being selected from anionic surfactant, nonionic surfactant, zwitterionic surfactant, cationic surfactant, amphoteric surfactant, and combinations thereof, more preferably wherein the surfactant comprises anionic surfactant.

M. A consumer product composition according to any of paragraphs A-L, wherein the consumer product adjunct comprises a conditioning active, preferably a conditioning active selected from a quaternary ammonium ester compound, a silicone, or a combination thereof.

N. A consumer product composition according to any of paragraphs A-M, wherein the consumer product composition is in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof, preferably a liquid composition.

O. A consumer product composition according to any of paragraphs A-N, wherein the consumer product composition is encapsulated in water-soluble film.

P. A consumer product composition according to any of paragraphs A-O, wherein the consumer product composition is a laundry detergent composition, a fabric conditioning composition, a laundry additive, a fabric pre-treat composition, a fabric refresher composition, a dishwashing composition, a hard surface cleaning composition, an air care composition, a car care composition, a hair treatment product, a skin care product, a shave care product, a personal cleansing product, a deodorant product, an antiperspirant product, or mixtures thereof.

Q. A consumer product composition according to any of paragraphs A-P, wherein the perfume comprises one or more aldehydic perfume raw materials selected from the group consisting of: 2,6-dimethyl-octanal; 2,2,5-trimethyl-4-Hexenal; Scentenal; 2-Phenyl-3-(2-furyl)prop-2-enal; (1)-Citronellal; Tetrahydrogeranial; 2-Ethoxybenzaldehyde; 5-Methylfurfural; Calypsone; d-xylose; 3-(2-furanyl)-2-methyl-2-propenal; 3,5,5-Trimethylhexanal; Canthoxal; 2,4,5-trimethoxy-benzaldehyde; 4-hydroxy-3-methoxy-cinnamaldehyde; 2,4,6-trimethoxybenzaldehyde; 3,4,5-trimethoxybenzaldehyde; 2,3,4-trimethoxy-benzaldehyde; (d)-Citronellal; Lyral; Methyl octyl acetaldehyde; Octanal, 3,7-dimethyl-; Adoxal; Citronellyloxyacetaldehyde; cis-3-Hexenyloxyacetaldehyde; Methoxymelonal; n-Hexanal; Pentyl vanillin; o-Methoxycinnamaldehyde; o-Anisaldehyde; Octanal; Nonaldehyde; 2,6,10-Trimethylundecanal; Citronellal; Melonal; Hydroxycitronellal; Prenal; Methyl nonyl acetaldehyde; Valeraldehyde; Capraldehyde; p-Anisaldehyde; Heptaldehyde; Ethyl vanillin; Vanillin; Heliotropin; Helional; Veratraldehyde; Methoxycitronellal; 7-Ethoxy-3,7-dimethyloctanal; 4-Ethoxybenzaldehyde; Vanillin isobutyrate; Vanillin acetate; Ethyl vanillin acetate; 1-methyl-4-(4-methyl-3-penten-1-yl)-3-Cyclohexene-1-carboxaldehyde; 8-Undecenal; trans,trans-2,4-Nonadienal; beta-Sinensal; 6-Cyclopentylidene hexanal; Precyclemone B; Tangerinal; 2-Thiophenecarboxaldehyde; 9-decenal; trans-2,cis-6-Nonadienal; Acalea; 4-tert-Butylbenzaldehyde; trans-2-Methyl-2-octenal; Citral; 3-Methyl-5-phenyl-1-pentanal; 2-Decenal; trans-2-Decenal; alpha,4-Dimethyl benzenepropanal; cis-5-Octenal; cis-7-Decen-1-al; cis-4-Decen-1-al; 2-trans-6-cis-Dodecadienal; 2-trans-4-trans-Dodecadienal; 3-Cyclohexene-1-propanal; 2-Nonen-1-al; 2-Undecenal; 2,4-Decadienal, (E,E)-; 2,4-Undecadienal, (E,E)-; Isohexenyl cyclohexenyl carboxaldehyde; trans-2-Nonen-1-al; 3-Nonylacrolein; 2,6-Nonadienal; Lilial; 2-trans-6-trans-Nonadienal; alpha-Sinensal; Bourgeonal; 2-Tridecenal; p-t-butyl phenyl acetaldehyde; (Z)-3-Dodecenal; m-Methylbenzaldehyde; Mefloral; trans-4-Decen-1-al; Silvial; 2-Hexen-1-al; 2,4-Nonadienal; Floralozone; Aldehyde C-11; cis-3-Hexenal; Myristaldehyde; Cinnamic aldehyde; p-Tolualdehyde; Undecanal; 10-Undecenal; Lauraldehyde; Trans-2-Hexenal; Geranial; 5-methyl-2-thiophenecarboxaldehyde; Phenylacetaldehyde; alpha-Amylcinnamaldehyde; Floral Super; Hexyl cinnamic aldehyde; alpha-methyl cinnamaldehyde; Benzaldehyde; or mixtures thereof; preferably selected from: Scentenal; Adoxal; Ocatanal; Nonaldehyde; Melonal; Methyl nonyl acetaldehyde; p-Anisaldehyde; Ethyl vanillin; Vanillin; Heliotropin; Lilial; Aldehyde C-11; Undecanal; 10-Undecenal; Lauraldehyde; or mixtures thereof.

R. A consumer product composition according to any of paragraphs A-Q, wherein the perfume comprises one or more ester perfume raw materials selected from the group consisting of: Quincester; Serenolide; Nirvanolide; Acetarolle; Alpinofix; Aladinate; Methyl Laitone; Firascone; 1-Hepten-1-ol, 1-acetate; (Z)-3-hepten-1-yl acetate; 3-hydroxy-4,5-dimethyl-2(5H)-furanone; Isoamyl undecylenate; Verdox HC; Pivarose Q; Citryl acetate; (E)-5-Tangerinol; (Z)-5-Tangerinol; Myraldyl acetate; Geranyl phenyl acetate; Bergaptene; Isopimpinellin; Parsol MCX; Ethyl beta-safranate; Nopyl acetate; Calyxol; Methyl Octalactone; Isopulegyl acetate; Ethyl tiglate; Vanoris; Acetoxymethyl-isolongifolene (isomers); 1-Oxaspiro[2.5]octane-2-carboxylic acid, 5,5,7-trimethyl-, ethyl ester; 3,6-Dimethyl-3-octanyl acetate; cis-3-hexenyl-cis-3-hexenoate; cis-3-Hexenyl lactate; Sclareolide; Hexarose; Cis-iso-ambrettolide; Frutinat; Ethyl gamma-Safranate; Amyl Cinnamate; Isoambrettolide; Bornyl isobutyrate; Cyprisate; Anapear; Montaverdi; Vertosine; Isobornyl isobutyrate; Cyprisate Ci; cyclobutanate; cis-3-Hexenyl butyrate; Geranyl tiglate; trans-Hedione; Isoamyl acetate; Givescone; Cyclogalbanate; Verdural B Extra; Ethyl alpha-safranate; Jasmal; Styrallyl acetate; Nonalactone; trans-ambrettolide; Furfuryl heptanoate; Furfuryl hexanoate; alpha-Amylcinnamyl acetate; Carvyl acetate; Ethyl isobutanoate; Citronellyl isobutyrate; Furfuryl octanoate; Octyl 2-furoate; Cedryl acetate; Isoamyl acetoacetate; Cis-3-hexenyl Benzoate; Phenyl ethyl benzoate; Hexenyl tiglate; Agrumea; gamma-Undecalactone (racemic); (S)-gamma-Undecalactone; (R)-gamma-Undecalactone; Phenyl benzoate; Geranyl benzoate; Isobutyl salicylate; Isoamyl salicylate; Verdox; 2-Acetoxy-3-butanone; Geranyl caprylate; (+)-D-Menthyl acetate; Prenyl benzoate; 7-Methoxycoumarin; cis-3-Hexenyl 2-methylbutyrate; cis-3-Hexenyl trans-2-hexenoate; Ethyl valerate; n-Pentyl butyrate; Ethyl 3-hydroxybutyrate; Flor Acetate; Hexyl Neopentanoate; Decyl propionate; Phenethyl tiglate; 2-Phenyl-1(2)propenyl-1 ester; Methyl cyclopentylideneacetate; Isononyl acetate; p-Cresyl crotonate; Octahydrocoumarin; Methyl trans-2,cis-4-decadienoate; 3,3,5-Trimethylcyclohexyl acetate; Hexyl vanillate; cis-3-Hexenyl levulinate; Dimethyl anthranilate; Methyl 2-methylbutyrate; Butyl salicylate; Isomenthyl acetate; Dihydrocarveol acetate; Tetrahydrolinalyl acetate; Dimethyl Octanyl Acetate; Methyl cis-4-octenoate; Hexahydro-3,5,5-trimethyl-3,8a-ethano-8aH-1-benzopyran-2(3H)-one; Cyclohexylethyl acetate; alpha-acetoxystyrene; p-methylbenzyl acetate; Heptyl propionate; gamma-Dodecalactone; Neryl isobutyrate; Geranyl isobutyrate; Hexyl isobutyrate; Methyl geraniate; or mixtures thereof; preferably Methyl Laitone; Verdox HC; Ethyl beta-safranate; Hexarose; cyclobutanate; Cyclogalbanate; Ethyl alpha-safranate; Jasmal; Styrallyl acetate; Nonalactone; gamma-Undecalactone (racemic); Verdox; Flor Acetate; or mixtures thereof.

S. A method of treating a surface or article with consumer product composition according to any of paragraphs A-R, the method comprising the step of contacting the surface or article with the consumer product composition, optionally in the presence of water.

TEST METHODS

Extraction of Encapsulates from Finished Products

Except where otherwise specified herein, the preferred method to isolate encapsulates from finished products is based on the fact that the density of most such encapsulates is different from that of water. The finished product is mixed with water in order to dilute and/or release the encapsulates. The diluted product suspension is centrifuged to speed up the separation of the encapsulates. Such encapsulates tend to float or sink in the diluted solution/dispersion of the finished product. Using a pipette or spatula, the top and bottom layers of this suspension are removed and undergo further rounds of dilution and centrifugation to separate and enrich the encapsulates. The encapsulates are observed using an optical microscope equipped with crossed-polarized filters or differential interference contrast (DIC), at total magnifications of 100× and 400×. The microscopic observations provide an initial indication of the presence, size, quality and aggregation of the encapsulates.

For extraction of encapsulates from a liquid fabric enhancer finished product conduct the following procedure:

1. Place three aliquots of approximately 20 ml of liquid fabric enhancer into three separate 50 ml centrifuge tubes and dilute each aliquot 1:1 with DI water (e.g. 20 ml fabric enhancer+20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched encapsulates appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the encapsulate enriched and isolated top and bottom layers back together.

If the fabric enhancer has a white color or is difficult to distinguish the encapsulate enriched layers add 4 drops of dye (such as Liquitint Blue JH 5% premix from Milliken & Company, Spartanburg, South Carolina, USA) into the centrifuge tube of step 1 and proceed with the isolation as described.

For extraction of encapsulates from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting encapsulates from finished products which do not disperse readily in water, such as waxes, dryer sheets, dryer bars, and greasy materials, it may be necessary to add detergents, agitation, and/or gently heat the product and diluent in order to release the encapsulates from the matrix. The use of organic solvents or drying out of the encapsulates should be avoided during the extraction steps as these actions may damage the encapsulates during this phase.

For extraction of encapsulates from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 100-200 g NaCl) can be added to the diluted suspension in order to increase the density of the solution and facilitate the encapsulates floating to the top layer. If the product has a white color which makes it difficult to distinguish the layers of encapsulates formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient encapsulates for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If encapsulates are observed microscopically in both the top and bottom layers, then the encapsulates from these two layers are recombined after the final centrifugation step, to create a single sample containing all the delivery encapsulates extracted from that product. The extracted encapsulates should be analyzed as soon as possible but may be stored as a suspension in DI water for up to 14 days before they are analyzed.

One skilled in the art will recognize that various other protocols may be constructed for the extraction and isolation of encapsulates from finished products and will recognize that such methods require validation via a comparison of the resulting measured values, as measured before and after the encapsulates' addition to and extraction from finished product.

Viscosity

Viscosity of liquid finished product is measured using an AR 550 rheometer/viscometer from TA instruments (New Castle, DE, USA), using parallel steel plates of 40 mm diameter and a gap size of 500 μm. The high shear viscosity at 20 $s^{-1}$ and low shear viscosity at 0.05 $s^{-1}$ is obtained from a logarithmic shear rate sweep from 0.1 $s^{-1}$ to 25 $s^{-1}$ in 3 minutes time at 21° C.

Encapsulate Shell Thickness

The encapsulate shell thickness is measured in nanometers on 50 encapsulates using freeze-fracture cryo-scanning electron microscopy (FF cryoSEM), at magnifications of between 50,000× and 150,000×. Samples are prepared by flash freezing small volumes of a suspension of encapsulates or finished product. Flash freezing can be achieved by plunging into liquid ethane, or through the use of a device such as a High Pressure Freezer Model 706802 EM Pact, (Leica Microsystems, Wetzlar, Germany). Frozen samples are fractured while at −120° C., then cooled to below −160° C. and lightly sputter-coated with gold/palladium. These steps can be achieved using cryo preparation devices such as those from Gatan Inc., (Pleasanton, CA, USA). The frozen, fractured and coated sample is then transferred at −170° C. or lower, to a suitable cryoSEM microscope, such as the Hitachi S-5200 SEM/STEM (Hitachi High Technologies, Tokyo, Japan). In the Hitachi S-5200, imaging is performed with 3.0 KV accelerating voltage and 5 μA-20 μA tip emission current.

Images are acquired of the fractured shell in cross-sectional view from 50 benefit delivery encapsulates selected in a random manner which is unbiased by their size, so as to create a representative sample of the distribution of encapsulate sizes present. The shell thickness of each of the 50 encapsulates is measured using the calibrated microscope software, by drawing a measurement line perpendicular to the outer surface of the encapsulate shell. The 50 independent shell thickness measurements are recorded and used to calculate the mean thickness, and the percentage of the encapsulates having a shell thickness within the claimed range.

Perfume and Perfume Raw Materials (PRMs)

To determine the identity and to quantify the weight of perfume, perfume ingredients, or Perfume Raw Materials (PRMs), encapsulated within the delivery agent encapsulates, Gas Chromatography with Mass Spectroscopy/Flame Ionization Detector (GC-MS/FID) is employed. Suitable equipment includes: Agilent Technologies G1530A GC/FID; Hewlett Packer Mass Selective Device 5973; and 5%-Phenyl-methylpolysiloxane Column J&W DB-5 (30 m length×0.25 mm internal diameter×0.25 μm film thickness). Approximately 3 g of the finished product or suspension of delivery encapsulates, is weighed and the weight recorded, then the sample is diluted with 30 mL of DI water and filtered through a 5.0 μm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 μm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

Test Method for Determining Log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume Weighted Median Encapsulate Size

Encapsulate size is measured using an Accusizer 780A, made by Encapsulate Sizing Systems, Santa Barbara CA. The instrument is calibrated from 0 to 300μ using Duke encapsulate size standards. Samples for encapsulate size evaluation are prepared by diluting about 1 g emulsion, if the volume weighted median encapsulate size of the emulsion is to be determined, or 1 g of capsule slurry, if the finished capsule volume weighted median encapsulate size is to be determined, in about 5 g of de-ionized water and further diluting about 1 g of this solution in about 25 g of water.

About 1 g of the most dilute sample is added to the Accusizer and the testing initiated, using the autodilution feature. The Accusizer should be reading in excess of 9200 counts/second. If the counts are less than 9200 additional sample should be added. The Accusizer will dilute the test sample until 9200 counts/second and initiate the evaluation. After 2 minutes of testing the Accusizer will display the results, including volume-weighted median size.

The broadness index can be calculated by determining the encapsulate size at which 95% of the cumulative encapsulate volume is exceeded (95% size), the encapsulate size at which 5% of the cumulative encapsulate volume is exceeded (5% size), and the median volume-weighted encapsulate size (50% size-50% of the encapsulate volume both above and below this size). Broadness Index (5)=((95% size)−(5% size))/50% size).

Acid Value Determination

To determine acid value of a perfume material, the following method is followed, which is based on DIN EN ISO 660: 2009-10.

In a 200-mL tri-pour cup, provide approximately 5 g of perfume to be tested; record the exact weight of perfume. To the perfume sample, add 100 mL of a solvent mixture formed from equal volumes of ethanol and ethyl ether (e.g., prepare a 1 L mixture made from 500 mL of each). Add 0.3 mL of phenolphthalein solution (formed from 1.0 g of phenolphthalein in 100 mL of ethanol). Add a stir bar, place on stir plate, and begin stirring the sample.

Add a pH probe to the sample and wait until the pH stabilizes. Neutralize the sample solution by slowly adding potassium hydroxide (0.1M KOH) via titration until the sample reaches a pH of 7.

At this point, record the initial volume of potassium hydroxide as the initial volume. Add 0.1M potassium hydroxide until a single drop produces a pink color change that persists for at least 15 seconds. Record the volume of potassium hydroxide as the final volume. Determine the total volume of potassium hydroxide added by determining the difference between the initial volume and the final volume (e.g., the volume of KOH solution added from when pH=7 to when the sample turns a persistent pink).

Determine the acid value (reported as mg of KOH/g of perfume) with the following equation:

$$\text{Acid Value} = \frac{56.1 * \text{Concentration of } KOH\ (M) * \text{Volume of } KOH\ (\text{mL})}{\text{Sample weight (g)}}$$

To note, 5 g sample of perfume is just a guide; it may be useful to use greater volumes for perfumes that have relatively low acid values, and lesser volumes for perfumes that have relatively high acid values. Depending on the outcome of the initial titration, the sample weight may be increased or decreased for a repeat of the test. Additionally, although the present procedure uses 0.1M KOH, greater molarities may be useful for perfumes that have relatively high acid values. The following table may be used as a rough guide.

| Approx. Acid Value of Perfume (mg KOH/g perf.) | Perfume Sample Weight (g) | KOH Concentration (M) |
|---|---|---|
| 0 to 1 | 10 | 0.1 |
| 1 to 4 | 5 | 0.1 |
| 4 to 15 | 2.5 | 0.1 |
| 15 to 75 | 0.5 | 0.1 |
| | 3.0 | 0.5 |
| >75 | 0.2 | 0.1 |
| | 1.0 | 0.5 |

Determining Perfume Leakage

To determine perfume leakage, a liquid detergent with perfume encapsulates is prepared and stored (e.g., one week at 35° C.), and then compared to a reference sample of liquid detergent having an equal level of total perfume (e.g., 1 wt %), though unencapsulated.

To prepare the Internal Standard Solution, weigh 70 mg of tonalid, add 20 mL hexane p.a., and mix. Add 200 μL of this mixture to 20 mL hexane p.a. and mix to homogenize, forming the Internal Standard Solution.

To extract the perfume from liquid phase of the test sample or the reference sample, 2 grams of the detergent sample and 2 mL of the Internal Standard Solution are placed into an extraction vessel. Free perfume is extracted from the detergent sample by gently inverting the extraction vessel manually twenty times. A spoon tip of sodium sulphate is added to the extraction vessel. A separation of layers should occur.

To collect Gas Chromatograph data, after the separation into layers, immediately transfer the hexane layer into a Gas Chromatograph auto sampler vial and cap the vial. Inject 1.5 uL splitless into the Gas Chromatograph injection port. Run Gas Chromatographic Mass Spectrometric analysis (Gas Chromatographic separation on Durawax-4 [60 m, 0.32 mm ID, 0.25 μm Film] 40° C./4° C./min/230° C./20').

The perfume leakage from the encapsulates is calculated per Perfume Raw Material according to the following calculation:

$$\% \text{ perfume leakage} = \frac{\text{Area Perfume Raw Material caps} \times \text{Area Internal Standard Solution } ref \times \text{Weight } ref}{\text{Area Internal Standard Solution caps} \times \text{Area Perfume Raw Material } ref \times \text{Weight caps}} * 100$$

Total leakage of a perfume is the sum of the perfume leakage from capsules per individual PRM.

To determine perfume retention (e.g., percentage of perfume that remains in the encapsulate), the "% perfume leakage" is subtracted from 100.

EXAMPLES

The examples provided below are intended to be illustrative in nature and are not intended to be limiting.

Example 1. Exemplary Perfumes

Perfumes according to the present disclosure, as well as comparative perfumes (labeled with "comp.") are provided in Table 1.

TABLE 1

| Perfume | Wt % of aldehydes | Wt % of esters | Total wt % of aldehydes + esters | Acid value (mg KOH/g of perfume) |
|---|---|---|---|---|
| 1A (comp.) | 17.0 | 52.4 | 69.4 | 0.80 |
| 1B (comp.) | 33.4 | 37.0 | 70.4 | 1.31 |
| 1C (comp.) | 35.9 | 38.6 | 74.5 | 2.00 |
| 1D (comp.) | 6.2 | 50.7 | 56.9 | 2.94* |
| 1E (comp.) | 12.7 | 47.7 | 60.4 | 3.53* |
| 1F | 10.8 | 34.1 | 44.9 | 5.94 |
| 1G | 10.4 | 47.7 | 58.1 | 6.32 |
| 1H | 4.7 | 45.4 | 50.1 | 7.32 |
| 1I | 13.0 | 36.5 | 49.5 | 16.49 |

*average of two batches

Example 2. Process of Making Encapsulates

Polyacrylate perfume capsules are made as follows: a first oil phase, consisting of 37.5 g perfume, 0.2 g tert-butylamino ethyl methacrylate, and 0.2 g beta hydroxyethyl acrylate is mixed for about 1 hour before the addition of 18 g CN975 (Sartomer, Exter, PA). The solution is allowed to mix until needed later in the process.

A second oil phase consisting of 65 g of the perfume oil, 84 g isopropyl myristate, 1 g 2,2'-azobis(2-methylbutyronitrile), and 0.8 g 4,4'-azobis[4-cyanovaleric acid] is added to a jacketed steel reactor. The reactor is held at 35° C. and the oil solution is mixed at 500 rpm with a 2" flat blade mixer. A nitrogen blanket is applied to the reactor at a rate of 300 cc/min. The solution is heated to 70° C. in 45 minutes and is held at 70° C. for 45 minutes, before cooling to 50° C. in 75 minutes. At 50° C., the first oil phase is added and the combined oils are mixed for another 10 minutes at 50° C.

A water phase, containing 85 g Selvol 540 polyvinylalcohol (Sekisui Specialty Chemicals, Dallas, TX) at 5% solids, 268 g water, 1.2 g 4,4'-azobis[4-cyanovaleric acid], and 1.1 g 21.5% NaOH, was prepared and mixed until the 4,4'-azobix[5-cyanovaleric acid] dissolves.

Once the oil phase temperature decreases to 50° C., mixing is stopped and the water phase is added to the mixed oils. High shear agitation is applied to produce an emulsion with the desired size characteristics (1900 rpm for 60 minutes).

The temperature is increased to 75° C. in 30 minutes, is held at 75° C. for 4 hours, is increased to 95° C. in 30 minutes, and is held at 95° C. for 6 hours.

Example 3. Encapsulate Leakage

To test for leakage, various perfumes are encapsulated in shells that include polyacrylate materials (including CN975 from Sartomer, Inc.) generally according to the encapsulation process described in Example 2. In addition to the perfumes provided below, the cores of the encapsulates comprise from about 30% to about 45% of a partitioning modifier (i.e., isopropyl myristate).

The encapsulates are added to a liquid detergent composition that is otherwise free of perfume. The encapsulates are added at a level to provide a total of 1% perfume, by weight of the detergent composition. The formulation of the liquid detergent is provided below in Table 2.

TABLE 2

| Ingredient | Level [wt % active] |
|---|---|
| Alkyl Ether Sulfate | 3.96 |
| Dodecyl Benzene Sulphonic Acid | 9.15 |
| Ethoxylated Alcohol | 3.83 |
| Amine oxide | 0.51 |
| Fatty Acid | 1.73 |
| Citric Acid | 2.79 |
| Sodium Diethylene triamine penta methylene phosphonic acid | 0.512 |
| Calcium chloride | 0.011 |
| Sodium formate | 0.034 |
| Ethoxysulfated hexamethylene diamine quaternized | 0.664 |
| Co-polymer of Polyethylene glycol and vinyl acetate | 1.27 |
| Optical Brightener 49 | 0.046 |
| 1,2-benzisothiazolin-3-one and 2-methyl-4-isothiazolin-3-one | 0.005 |
| Ethanol | 0.42 |
| 1,2-propanediol | 1.259 |
| Sodium Cumene Sulphonate | 1.724 |
| Mono ethanol amine | 0.24 |
| NaOH | 3.1 |
| Hydrogenated Castor Oil structurant | 0.3 |
| Silicone emulsion | 0.0025 |
| Dye | 0.0054 |
| Perfume (encapsulated in test sample; unencapuslated in reference sample) | 1.0 |
| Water, minors | Balance |

The liquid detergent samples are aged for one week at 35° C. After storage, the samples are analyzed for perfume leakage via hexane extraction as detailed in the test method section above. Leakage is measured versus a reference sample containing 1%, by weight of the reference sample, of unencapsulated perfume of the same identity.

The perfumes tested are some of those provided in Example 1, Table 1 above. Trials 1-5 show encapsulates comprising comparative perfumes, which are characterized by acid values less than 5.0 mg KOH/g. Trials 6-9 show encapsulates comprising perfumes according to the present disclosure, which are characterized by acid values of greater than 5.0 mg KOH/g.

Perfume leakage results are shown in Table 3. FIG. 1 shows a graph of acid values versus perfume retention, measured as the percentage of perfume remaining in the encapsulates.

TABLE 3

| Trials | Perfume (from Table 1) | Acid value (mg KOH/g) | Perfume leakage (%) | Perfume retention (% remaining in the encapsulate) |
|---|---|---|---|---|
| 1 (comp.) | 1A | 0.8 | 10.67* | 89.33* |
| 2 | 1B | 1.31 | 9.79 | 90.21 |

TABLE 3-continued

| Trials | Perfume (from Table 1) | Acid value (mg KOH/g) | Perfume leakage (%) | Perfume retention (% remaining in the encapsulate) |
|---|---|---|---|---|
| (comp.) | | | | |
| 3 (comp.) | 1C | 2.00 | 2.19 | 97.81 |
| 4 (comp.) | 1D | 2.94 | 7.52** | 92.48** |
| 5 (comp.) | 1E | 3.53 | 3.78 | 96.22 |
| 6 | 1F | 5.94 | 8.9* | 91.10* |
| 7 | 1G | 6.32 | 7.66* | 92.34* |
| 8 | 1H | 7.32 | 13.33** | 86.67** |
| 9 | 1I | 16.49 | 19.54 | 80.46 |

*average of two samples
**average of three samples

According to the results in Table 3 and FIG. 1, perfumes encapsulates that include polyacrylate materials in the encapsulate shell show relatively little leakage upon storage in a detergent product, even when the perfume is characterized by an acid value of greater than 5.0 mg KOH/g.

Although tested under different temperature and timings, this trend stands in stark contrast from the trend disclosed in WO2017/148504, which indicates that very little perfume is retained in a capsule when the perfume is characterized by an acid value of greater than 5 mg KOH/g of perfume. Without wishing to be bound by theory, it is believed that selection of the encapsulate wall material (here, a polyacrylate material) contributes to the relative stability of the encapsulates of the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product composition comprising:
encapsulates,
the encapsulates comprising a core and a shell surrounding the core,
the core comprising a perfume,
the perfume being characterized by an acid value of greater than 5.0 mg KOH/g immediately before encapsulation, where the perfume comprises one or more ester compounds, and
the shell comprising a polymeric material,
the polymeric material comprising a (meth)acrylate material derived from hexafunctional acrylate; and
a consumer product adjunct.

2. The consumer product composition according to claim 1, wherein the perfume is characterized by an acid value of greater than about 5.25 mg/KOH immediately before encapsulation.

3. The consumer product composition according to claim 1, wherein the perfume comprises from about 30% to about 75%, by weight of the total perfume in the core immediately after encapsulate formation, of aldehyde compounds, ester compounds, or mixtures thereof.

4. The consumer product composition according to claim 1, wherein the perfume comprises a material selected from the group consisting of: aliphatic aldehydes and/or their acetals; cycloaliphatic aldehydes; aromatic and/or araliphatic aldehydes; aliphatic, aromatic, or araliphatic esters; lactones; or mixtures thereof.

5. The consumer product composition according to claim 1, wherein the perfume comprises one or more aldehydic perfume raw materials selected from the group consisting of: 2,6-dimethyl-octanal; 2,2,5-trimethyl-4-hexenal; scentenal; 2-phenyl-3-(2-furyl) prop-2-enal; (l)-citronellal; tetrahydrogeranial; 2-ethoxybenzaldehyde; 5-methylfurfural; calypsone; d-xylose; 3-(2-furanyl)-2-methyl-2-propenal; 3,5,5-trimethylhexanal; canthoxal; 2,4,5-trimethoxy-benzaldehyde; 4-hydroxy-3-methoxy-cinnamaldehyde; 2,4,6-trimethoxybenzaldehyde; 3,4,5-trimethoxybenzaldehyde; 2,3,4-trimethoxy-benzaldehyde; (d)-citronellal; lyral; methyl octyl acetaldehyde; octanal, 3,7-dimethyl-; adoxal; citronellyloxyacetaldehyde; cis-3-hexenyloxyacetaldehyde; methoxymelonal; n-hexanal; pentyl vanillin; o-methoxycinnamaldehyde; o-anisaldehyde; octanal; nonaldehyde; 2,6,10-trimethylundecanal; citronellal; melonal; hydroxycitronellal; prenal; methyl nonyl acetaldehyde; valeraldehyde; capraldehyde; p-anisaldehyde; heptaldehyde; ethyl vanillin; vanillin; heliotropin; helional; veratraldehyde; methoxycitronellal; 7-ethoxy-3,7-dimethyloctanal; 4-ethoxybenzaldehyde; vanillin isobutyrate; vanillin acetate; ethyl vanillin acetate; 1-methyl-4-(4-methyl-3-penten-1-yl)-3-cyclohexene-1-carboxaldehyde; 8-undecenal; trans, trans-2,4-nonadienal; beta-sinensal; 6-cyclopentylidene hexanal; precyclemone B; tangerinal; 2-thiophenecarboxaldehyde; 9-decenal; trans-2,cis-6-nonadienal; acalea; 4-tert-butylbenzaldehyde; trans-2-methyl-2-octenal; citral; 3-methyl-5-phenyl-1-pentanal; 2-decenal; trans-2-decenal; alpha,4-dimethyl benzenepropanal; cis-5-octenal; cis-7-decen-1-al; cis-4-decen-1-al; 2-trans-6-cis-dodecadienal; 2-trans-4-trans-dodecadienal; 3-cyclohexene-1-propanal; 2-nonen-1-al; 2-undecenal; 2,4-decadienal, (E,E)-; 2,4-dndecadienal, (E,E)-; isohexenyl cyclohexenyl carboxaldehyde; trans-2-nonen-1-al; 3-nonylacrolein; 2,6-nonadienal; lilial; 2-trans-6-trans-nonadienal; alpha-sinensal; bourgeonal; 2-tridecenal; p-t-butyl phenyl acetaldehyde; (Z)-3-dodecenal; m-methylbenzaldehyde; mefloral; trans-4-decen-1-al; silvial; 2-hexen-1-al; 2,4-nonadienal; floralozone; aldehyde C-11; cis-3-hexenal; myristaldehyde; cinnamic aldehyde; p-tolualdehyde; undecanal; 10-undecenal; lauraldehyde; trans-2-hexenal; geranial; 5-methyl-2-thiophenecarboxaldehyde; phenylacetaldehyde; alpha-amylcinnamaldehyde; floral super; hexyl cinnamic aldehyde; alpha-methyl cinnamaldehyde; benzaldehyde; and mixtures thereof.

6. The consumer product composition according to claim 1, wherein the perfume comprises one or more aldehydic perfume raw materials selected from the group consisting of: scentenal; adoxal; ocatanal; nonaldehyde; melonal; methyl nonyl acetaldehyde; p-anisaldehyde; ethyl vanillin; vanillin; heliotropin; lilial; aldehyde C-11; undecanal; 10-undecenal; lauraldehyde; and mixtures thereof.

7. The consumer product composition according to claim 1, wherein the perfume comprises one or more ester perfume raw materials selected from the group consisting of: quincester; serenolide; nirvanolide; acetarolle; alpinofix; aladinate; methyl laitone; firascone; 1-hepten-1-ol, 1-acetate; (Z)-3-hepten-1-yl acetate; 3-hydroxy-4,5-dimethyl-2 (5H)-furanone; isoamyl undecylenate; verdox HC; pivarose Q; citryl acetate; (E)-5-tangerinol; (Z)-5-tangerinol; myraldyl acetate; geranyl phenyl acetate; bergaptene; isopimpinellin; parsol MCX; ethyl beta-safranate; nopyl acetate; calyxol; methyl octalactone; isopulegyl acetate; ethyl tiglate; vanoris; acetoxymethyl-isolongifolene (isomers); 1-oxaspiro[2.5] octane-2-carboxylic acid, 5,5,7-trimethyl-, ethyl ester; 3,6-dimethyl-3-octanyl acetate; cis-3-hexenyl-cis-3-hexenoate; cis-3-hexenyl lactate; sclareolide; hexarose; cis-iso-ambrettolide; frutinat; ethyl gamma-safranate; amyl cinnamate; isoambrettolide; bornyl isobutyrate; cyprisate; anapear; montaverdi; vertosine; isobornyl isobutyrate; cyprisate ci; cyclobutanate; cis-3-hexenyl butyrate; geranyl tiglate; trans-hedione; isoamyl acetate; givescone; cyclogalbanate; verdural B extra; ethyl alpha-safranate; jasmal; styrallyl acetate; nonalactone; trans-ambrettolide; furfuryl heptanoate; furfuryl hexanoate; alpha-amylcinnamyl acetate; carvyl acetate; ethyl isobutanoate; citronellyl isobutyrate; furfuryl octanoate; octyl 2-furoate; cedryl acetate; isoamyl acetoacetate; cis-3-hexenyl benzoate; phenyl ethyl benzoate; hexenyl tiglate; agrumea; gamma-undecalactone (racemic); (S)-gamma-undecalactone; (R)-gamma-undecalactone; phenyl benzoate; geranyl benzoate; isobutyl salicylate; isoamyl salicylate; verdox; 2-acetoxy-3-butanone; geranyl caprylate; (+)-D-menthyl acetate; prenyl benzoate; 7-methoxycoumarin; cis-3-hexenyl 2-methylbutyrate; cis-3-hexenyl trans-2-hexenoate; ethyl valerate; n-pentyl butyrate; ethyl 3-hydroxybutyrate; flor acetate; hexyl neopentanoate; decyl propionate; phenethyl tiglate; 2-phenyl-1 (2) propenyl-1 ester; methyl cyclopentylideneacetate; isononyl acetate; p-cresyl crotonate; octahydrocoumarin; methyl trans-2,cis-4-decadienoate; 3,3,5-trimethylcyclohexyl acetate; hexyl vanillate; cis-3-hexenyl levulinate; dimethyl anthranilate; methyl 2-methylbutyrate; butyl salicylate; isomenthyl acetate; dihydrocarveol acetate; tetrahydrolinalyl acetate; dimethyl octanyl acetate; methyl cis-4-octenoate; hexahydro-3,5,5-trimethyl-3,8a-ethano-8aH-1-benzopyran-2 (3H)-one; cyclohexylethyl acetate; alpha-acetoxystyrene; p-methylbenzyl acetate; heptyl propionate; gamma-dodecalactone; neryl isobutyrate; geranyl isobutyrate; hexyl isobutyrate; methyl geraniate; and mixtures thereof.

8. The consumer product composition according to claim 1, wherein the perfume comprises one or more ester perfume raw materials selected from the group consisting of: methyl laitone; verdox HC; ethyl beta-safranate; hexarose; cyclobutanate; cyclogalbanate; ethyl alpha-safranate; jasmal; styrallyl acetate; nonalactone; gamma-undecalactone (racemic); verdox; flor acetate; and mixtures thereof.

9. The consumer product composition according to claim 1, wherein the core further comprises a partitioning modifier selected from the group consisting of vegetable oil, modified vegetable oil, mono-, di-, and tri-esters of C4-C24 fatty acids, isopropyl myristate, dodecanophenone, lauryl laurate, methyl behenate, methyl laurate, methyl palmitate, methyl stearate, and mixtures thereof.

10. The consumer product composition according to claim 1, wherein the polymeric material of the shell is formed, at least in part, by a radical polymerization process.

11. The consumer product composition according to claim 1, wherein the encapsulates are characterized by a volume weighted median diameter of about 10 to about 100 microns.

12. The consumer product composition according to claim 1, wherein the consumer product adjunct comprises a material selected from the group consisting of surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, pigments, and mixtures thereof.

13. A consumer product composition according to claim 1, wherein the consumer product adjunct comprises a surfactant selected from the group consisting of anionic surfactant, nonionic surfactant, zwitterionic surfactant, cationic surfactant, amphoteric surfactant, and combinations thereof.

14. A consumer product composition according to claim 1, wherein the consumer product adjunct comprises a conditioning active selected from the group consisting of a quaternary ammonium ester compound, a silicone, and combinations thereof.

15. The consumer product composition according to claim 1, wherein the consumer product composition is in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof.

16. The consumer product composition according to claim 1, wherein the consumer product composition is a laundry detergent composition, a fabric conditioning composition, a laundry additive, a fabric pre-treat composition, a fabric refresher composition, a dishwashing composition, a hard surface cleaning composition, an air care composition, a car care composition, a hair treatment product, a skin care product, a shave care product, a personal cleansing product, a deodorant product, an antiperspirant product, or mixtures thereof.

17. A method of treating a surface or article with a consumer product composition according to claim 1, the method comprising the step of contacting the surface or article with the consumer product composition, optionally in the presence of water.

* * * * *